Dec. 28, 1954  J. A. SHAFER  2,697,989
CAR TRUCK

Filed June 21, 1947  2 Sheets-Sheet 1

INVENTOR.
James A Shafer
BY
Albert E. Field
ATTORNEY

Dec. 28, 1954  J. A. SHAFER  2,697,989
CAR TRUCK
Filed June 21, 1947 2 Sheets-Sheet 2
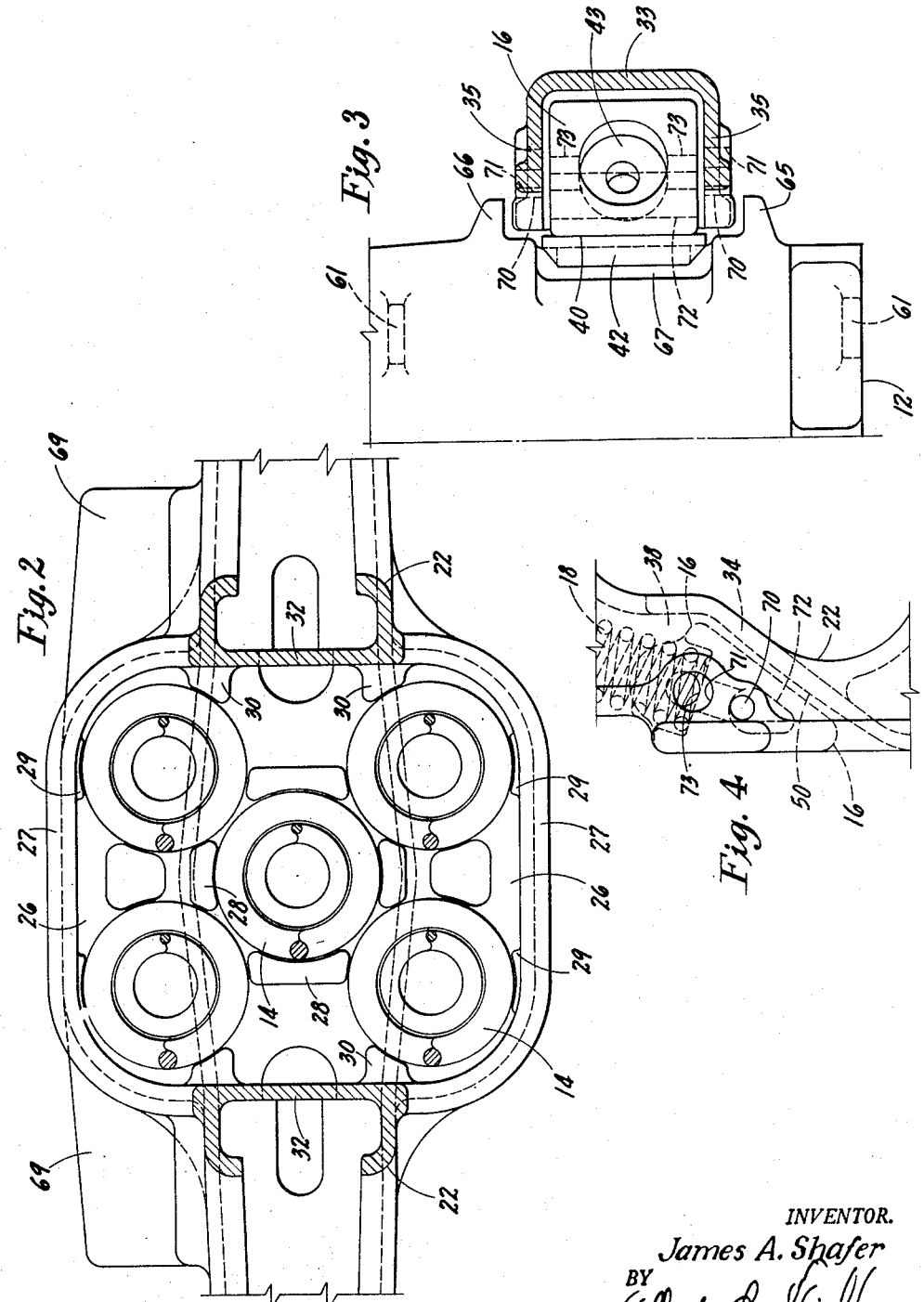
INVENTOR.
James A. Shafer
BY
Albert P. Field
ATTORNEY

United States Patent Office 2,697,989
Patented Dec. 28, 1954

2,697,989

CAR TRUCK

James A. Shafer, East Cleveland, Ohio, assignor to National Malleable and Steel Castings Company, Cleveland, Ohio, a corporation of Ohio Application June 21, 1947, Serial No. 756,135

8 Claims. (Cl. 105—197)

This invention relates to railway car trucks and more particularly to a car truck utilizing a friction system for controlling the movements of the bolster.

An object of my invention is to provide a car truck with a built-in friction system which supplies a substantially constant frictional force for controlling vertical movement of the bolster.

Another object of my invention is to provide in a car truck a friction mechanism which controls the vertical oscillations of the bolster supporting springs and also cushions movement of the bolster longitudinally of the car truck.

A further object is to provide a car truck having a novel friction system for controlling oscillations of the bolster supporting springs which is simple in construction and efficient in operation.

A still further object is to provide a car truck having a built-in friction system which is associated with the sides of the bolster, the bolster being of full box section.

A more specific object is to provide in a car truck friction means mounted in the side frame columns and cooperating with the bolster sides for controlling vertical movement of the bolster as well as for cushioning movement thereof longitudinally of the car truck.

Another object is to provide in a car truck a friction mechanism comprising a wedge-shaped member resiliently urged into engagement with the sides of the bolster for controlling vertical as well as lateral movement thereof.

A still further object is to provide in a car truck a friction system which in addition to controlling vertical oscillations of the bolster possesses the flexibility necessary for permitting a limited amount of rotational movement of the bolster about its longitudinal axis relative to the truck side frames.

Other objects and advantages of my invention will be apparent from the following description thereof taken in conjunction with the drawings in which:

Fig. 2 is a horizontal sectional view taken along line 2—2 of Fig. 1, with the bolster removed.

Fig. 3 is plan view partly in section, taken along line 3—3 of Fig. 1.

Fig. 4 is a fragmentary view showing one of the friction members in position for disassembling the bolster from the side frame.

Figure 1:
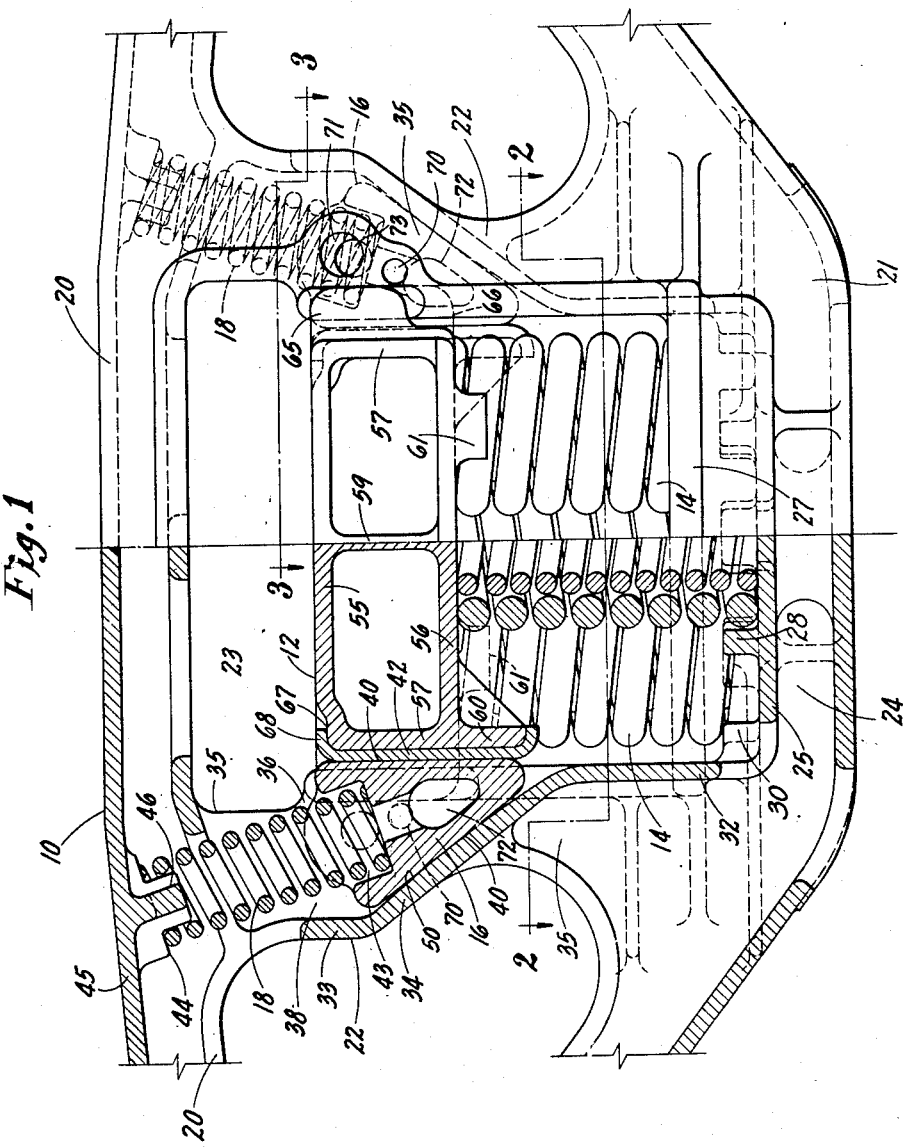
Fig. 1 is an elevational view partly in vertical longitudinal section of a car truck embodying the invention.

Referring to the drawings the car truck illustrated broadly comprises a side frame 10, a bolster 12, springs 14, supporting the bolster on the side frame, and friction wedges 16 urged into engagement with the sides of the bolster by springs 18. While only one side frame with its associated bolster end is shown, it will be understood that the other side of the truck has a similar side frame associated with the bolster in like manner.

Side frame 10 comprises a compression member 20 and tension member 21 connected by a pair of spaced columns 22 and forming the bolster receiving opening 23. The central portion 24 of the tension member is of box section and comprises a top wall 25 which is widened on each side thereof as at 26 to form a spring seat for accommodating coil springs 14. Upstanding flanges 27 at the outer edges of the spring seat serve to retain springs 14 thereon. These flanges also serve to strengthen the spring seating portion of the frame, whose section has been reduced in depth to permit the use of long travel springs. Central spring 14 is positioned by means of upstanding lugs 28 on the spring seat while lugs 29 and 30, in conjunction with lugs 28, are provided for positioning the inboard and outboard springs 14.

Each of springs 14 preferably includes an inner and outer coil spring. These springs are of greater length and deflection than usually found in freight car trucks and therefore provide for improved cushioning of the bolster. The particular springs illustrated have a travel of approximately 4 inches from free height to solid height. The use of these long travel springs is made possible by the lowering of top wall 25 of the spring seat portion of the side frame and by the full box section bolster construction which is particularly suitable for cooperation with friction wedges 16. The box section permits decreasing the depth of the bolster to accommodate the long travel springs while also assuring adequate strength of the member. Furthermore, these springs are made of wire which is circular in section, rather than non-circular, such as oval, which would be necessary if only springs of shorter length could be used and it was desired to obtain the same amount of travel and capacity.

Each column 22 comprises a vertical inner wall 32 forming a continuation of top wall 25 of the tension member, a vertical outer wall 33 merging with compression member 20, and an outwardly and upwardly extending wall 34 joining walls 32 and 33. These walls extend transversely into engagement with vertical sidewalls 35 which merge with the compression and tension members. Pockets 38 are formed in the upper portion of the columns by walls 33, 34 and 35, for accommodating friction wedges 16 and springs 18. Each pocket 38 is open on the inner side of the column as at 36 through which wedge 16 and spring 18 are inserted during assembly of the truck.

Wedge 16 is preferably symmetrical and comprises converging faces 40 which engage diagonal wall 34 and vertically positioned wear plate 42 on the side of the bolster. Wedge 16 is urged into engagement with plate 42 by means of spring 18 which is under a predetermined amount of initial compression. The lower end of spring 18 is received in a recess 43 in wedge 16 while the upper end of the spring extends into compression member 20 and bears against a seat 44 on the inner side of top web 45. Seat 44 is formed with depending lugs 46 for positioning and retaining the upper end of spring 18.

It will be observed that spring 18 is inclined to the vertical so that the expansive force of the spring is directed downwardly and toward the side of the bolster. With the angle between faces 40 on the friction wedge as shown the normal force exerted by the wedge against wear plate 42 is substantially greater than the expansive force of the spring. Since wear plate 42 and the engaging face 40 of wedge 16 are positioned in a vertical plane, the friction therebetween acts with substantially constant force to oppose downward or upward movement of the bolster and thereby effectively control the oscillations of bolster supporting springs 14.

Although the frictional force exerted by the wedges against the sides of the bolster is substantially constant, the force restraining downward movement of the bolster is somewhat greater than the force opposing upward movement thereof. This is due to the fact that as the bolster moves downwards the friction between the wedge and bolster serves to aid spring 18 in urging the wedge into engagement with the bolster, and thus increase the frictional force therebetween. However, as the bolster moves upwards the frictional force acts to oppose the expansive force of spring 18, thereby decreasing the frictional force opposing rebound of the bolster. It will be noted that this frictional force acting on both sides of the bolster is independent of the load carried by springs 14 and therefore is of the same magnitude whether a car is empty or loaded.

Wedges 16 are held firmly by springs 18 against wear plates 42 and walls 34, thereby precluding any looseness or rattling of the parts in service. Furthermore, as wear occurs between the wedges and wear plates the expansive force of springs 18 automatically maintains the engagement therebetween. Similarly, variations in manufacturing tolerances will be compensated for by either compression or expansion of spring 18, as the case may be, so that proper functioning of the wedges with the bolster will be assured.

In order to assure full surface contact between vertical face 40 of the wedge and wear plate 42, surface 50 of wall 34 which is engaged by the other of faces 40 is crowned in a vertical direction. This crowned surface permits the wedge to rock relatively to the side frame as when the car travels over rough track and yet maintain full frictional contact with the side of the bolster. Wedges 16 in conjunction with springs 18 also cushion movement of the bolster in a direction longitudinally of the side frames. For example during acceleration or deceleration of the car the normal force exerted by the bolster against the vertical contacting face 40 of one of the wedges will cause the wedge to slide upwardly along surface 50 against the resistance of spring 18. Thus, movement of the bolster in either direction longitudinally of the side frame is effectively cushioned by wedges 16. It will be noted that this cushioning is effected by the frictional forces along both faces 40 of the wedge as it slides upwardly into pocket 38 and by spring 18.

A further feature resides in the squaring action provided by the pressure of wedges 16 against the bolster. The bolster due to this pressure against its side will tend to remain square with respect to the side frames and any tendency towards unsquaring will be resisted by springs 18.

The bolster end which extends into opening 23 on the side frame is of full box section comprising top wall 55, bottom wall 56 and side walls 57. The top and bottom walls are connected by a central reenforcing web 59. Side walls 57 in the region of columns 22 are extended below bottom wall 56 as at 60 so as to obtain a substantial area of contact between wedge 16 and the bolster. Fig. 1 shows the relative positions of the bolster and friction wedges when the bolster is under a load corresponding to that of a fully loaded car.

The opposition of springs 14 to transverse deflection is utilized to effect cushioning of the bolster laterally of the car truck. This is accomplished by confining the upper and lower ends of the pairs of inboard and outboard springs 14. The lower ends of these springs are confined by lugs 28, 29 and 30 while the upper ends are confined by lugs 61 depending from bottom wall 56 of the bolster. In addition the frictional force between shoes 16 and the bolster assists springs 14 in restraining the aforementioned lateral movement of the bolster.

The bolster is tied to the side frame by means of vertical guide lugs 65 and 66 which overlap side walls 35 of columns 22. These lugs are adapted to engage the columns to limit lengthwise movement of the bolster in both directions relative to the side frame. It will be noted that the vertical extent of lugs 65 is such as to enable them to pass through the widened upper portions of opening 23 in the side frame when the bolster is raised during removal of the side frame. Lugs 66 however, extend the full depth of the bolster and provide a substantial bearing surface for engagement with the columns.

It will be observed that the edges of top walls 55 are depressed slightly as at 67 so that the inward extension 68 of plate 42 will be flush with the top surface of wall 55. This permits keeping to a minimum the vertical dimension of widened upper portion of bolster opening 23.

A flange or ledge 69 extending laterally from the sideframe serves as a safety support for the brake head of the car truck in the event of failure of the brake hanger. This feature is covered in my patent No. 1,975,869 dated October 9, 1934.

To facilitate assembly and disassembly of the side frames and bolster, openings 70 and 71 in sidewalls 35 of the columns and openings 72 and 73 in the friction wedges are provided so that the wedges may be moved out of engagement with the bolster and maintained in such position during these operations. Openings 70 and 72 are so arranged that when wedges 16 are moved upwards in pockets 38 out of engagement with the bolster (as shown in Fig. 4), a pin may be inserted through openings 70 and 72 to retain the wedge in that position. Openings 71 and 73 have been so disposed that by means of a pinch bar inserted therein the wedge may be raised to permit the above-mentioned pin to be inserted through openings 70 and 72. With the friction wedges thus retained out of engagement with the bolster the latter may be raised until guide lugs 65 are in line with the widened portion of opening 23, after which the side frames may be easily withdrawn from the end of the bolster.

To assemble the bolster and side frames the bolster is supported in elevated position and the side frames are moved thereon, wedges 16 being held in withdrawn position by the pin inserted in openings 70 and 72 of the wedge and side frame, respectively. With the bolster still in raised position all of springs 14 are applied, after which the bolster may be lowered onto the springs. Thereafter, the pins in openings 70 and 72 are removed to permit wedges 16 to engage the bolster sides, completing the assembling operation.

It will be understood that since wedges 16 are symmetrical they are reversible, and therefore in assembling the truck there is no danger of incorrectly applying the wedges to the side frame.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck a side frame having a compression member, a tension member and spaced columns forming a bolster receiving opening therewith, the spacing of said columns being greater in the upper end of said opening, a bolster extending into said opening and being resiliently supported on said side frame, said bolster having vertical side surfaces facing said columns, a pocket in each of said columns having a transverse wall sloping upwardly and away from the side of the bolster, said bolster being of box section, springs on said tension member engaging the lower surface of said box section, and resiliently supporting said bolster, the side walls of said bolster opposite said columns being extended downwardly below the bottom wall of said box section and providing downward continuations of said bolster side surfaces, and a friction member in each of said pockets having a pair of converging faces engaging said transverse wall, bolster side surfaces and downward extensions, said friction member engaging said bolster below the widened portion of said bolster receiving opening, said members being adapted to be withdrawn from engagement with said side surfaces to permit raising of the bolster into said widened end of said bolster receiving opening prior to withdrawal of the side frame from the bolster.

2. In a car truck, a side frame having a compression member, a tension member and spaced columns forming a bolster receiving opening therewith, a bolster extending into said opening, said bolster receiving opening being widened in its upper portion, said bolster having guide lugs for engagement with the sides of said columns below the widened portion of said bolster receiving opening, said sideframe being removable from said bolster when the latter is raised to said widened portion of said opening, a pocket in each of said columns having a transverse wall sloping upwardly and away from the opposing side of the bolster, said bolster being of box section and having a projection extending downwardly from the bottom wall thereof and forming a continuation of the vertical side surface of the bolster, a friction wedge in engagement with said sloping wall, said vertical bolster side surface and said downward projection; said downward projection in conjunction with said side surface of the bolster serving to maintain the bolster engaging surface of said wedge vertical throughout vertical travel of the bolster, said friction wedge being so positioned as to extend into the portion of said bolster receiving opening below said widened upper portion to permit removal of said sideframe from said bolster when the latter is raised to the widened portion of said opening.

3. A railway car truck comprising a side frame having tension and compression members, columns extending between said members and forming therewith a bolster receiving window having a widened upper portion, a bolster of box section, springs on said tension member supporting said bolster, said bolster having pairs of lugs integral therewith and overlapping opposite sides of said columns below said upper portion of said window, said columns having pockets with transverse surfaces inclined upwardly and away from said bolster, a shoe in each pocket having a pair of converging faces engaging the transverse wall of the pocket and a portion of the bolster between the adjacent pair of column-overlapping bolster lugs, the side walls of said bolster opposite said columns being extended downwardly below the bottom wall of said box section for engagement by said shoes, and springs engaging said shoes to maintain the latter in frictional engagement with said pocket walls and bolster portions.

4. A railway car truck comprising a side frame having tension and compression members, columns extending between said members and forming therewith a bolster receiving window having a widened upper portion, a bolster, springs on said tension member supporting said bolster, said bolster having pairs of lugs integral therewith and overlapping opposite sides of said columns below said upper portion of said window, said columns having pockets with transverse surfaces inclined upwardly and away from said bolster, a shoe in each pocket having a pair of converging faces engaging the transverse wall of the pocket and a portion of the bolster between the adjacent pair of column-overlapping bolster lugs, springs acting upon said shoes to maintain the latter in frictional engagement with said pocket walls and bolster portions, said side frame compression member comprising a continuous top web having integral seats on the underside thereof for engagement by the upper ends of said springs.

5. In a car truck a sideframe having a compression member, a tension member and spaced columns forming a bolster receiving opening therewith, the spacing of said columns being greater in the upper end of said opening, a bolster extending into said opening and being resiliently supported on said sideframe, said bolster having vertical side surfaces facing said columns, said bolster being of box section, springs on said tension member engaging the lower surface of said box section, a pair of lugs on one side of an end portion of said bolster for overlapping opposite sides of one of said side frame columns when said bolster is below said upper end of said opening, a pair of lugs on the opposite side of said end portion of said bolster for overlapping opposite sides of the other of said side frame columns when said bolster is below said upper end of said opening, one lug of each pair being shorter than the other lug of the pair to enable said shorter lugs to pass into said upper end of said opening and clear the adjacent side frame column when the bolster is raised for removal of the side frame, a pocket in each of said columns having a transverse wall sloping upwardly and away from a side surface of the bolster between the adjacent pair of lugs, and a friction member in each of said pockets, each of said friction members having a pair of converging faces engaging the transverse wall of a pocket and the bolster surface opposite said wall.

6. In a railway car truck a side frame having a compression member, a tension member and spaced columns forming a bolster opening therewith, a bolster extending into said opening and resiliently supported on said side frame, said bolster having vertical surfaces facing said columns, said columns having a transverse wall sloping upwardly and away from said vertical surfaces, a friction member wedged between each of said walls and said bolster surface, and spring means reacting against the upper end of each of said friction members along a line extending at an angle to said vertical surface, said compression member comprising a continuous top web having an integral spring seat on the underside thereof for engagement with the upper end of said spring means.

7. In a railway car truck, a side frame including compression and tension members, columns connecting said members and forming therewith a bolster-receiving window, said columns having transverse walls sloping outwardly from said window, friction shoes having wedging surfaces directly engaging said sloping walls, and springs bearing at their upper ends against said compression member and at their lower ends against said shoes for urging said shoes downwardly along said sloping walls, said shoes and said side frame having openings therein for receiving an implement to shift said shoes out of friction-developing position, said shoes and side frame also having other openings therein for receiving pins to maintain said shoes out of friction-developing position.

8. In a car truck, a side frame having a compression member, a tension member and spaced columns joining said members and forming a bolster receiving opening therewith; a bolster having an end extending into said opening and having a pair of guide lugs extending laterally therefrom and overlapping said columns in all operative positions of said bolster, said bolster opening having a widened portion for reception of said lugs during assembly of said bolster and side frame, said bolster end having top, bottom and side walls forming a box section and having portions forming continuations of said side walls and extending from said bolster end in a direction opposite to the widened portion of said bolster receiving opening; a pocket in each of said columns opening toward said bolster and having a wall extending transversely of said side frame and sloping longitudinally thereof; a friction member in said pocket and disposed adjacent the widened portion of said bolster receiving opening, said friction member having surfaces in engagement with the adjacent side wall and extending portion of said bolster end and with said sloping wall, spring means reacting between said friction member and said side frame to urge said members into engagement with said bolster and said sloping wall; said friction member being movably mounted in said pocket for retraction away from said bolster to enable ready assembly of said bolster and side frame; said friction member being so positioned relative to the adjacent widened portion of said bolster receiving opening that in its said retracted position all portions thereof remain clear of said widened portion to permit free passage of said bolster guide lugs into the widened portion of said bolster receiving opening during the assembly of said bolster and side frame.

References Cited in the file of this patent

UNITED STATES PATENTS

| Number | Name | Date |
|---|---|---|
| 1,493,192 | Dorey | May 6, 1924 |
| 1,894,385 | Webb | Jan. 17, 1933 |
| 2,352,693 | Davidson | July 4, 1944 |
| 2,375,918 | Haseltine | May 15, 1945 |
| 2,378,414 | Light | June 19, 1945 |
| 2,382,563 | Haseltine | Aug. 14, 1945 |
| 2,407,875 | Geiger | Sept. 17, 1946 |
| 2,413,458 | Light | Dec. 31, 1946 |
| 2,424,936 | Light | July 29, 1947 |
| 2,425,822 | Olander | Aug. 19, 1947 |
| 2,434,583 | Pierce | Jan. 13, 1948 |
| 2,437,359 | Pierce | Mar. 9, 1948 |
| 2,575,137 | Settles et al. | Nov. 13, 1951 |